UNITED STATES PATENT OFFICE.

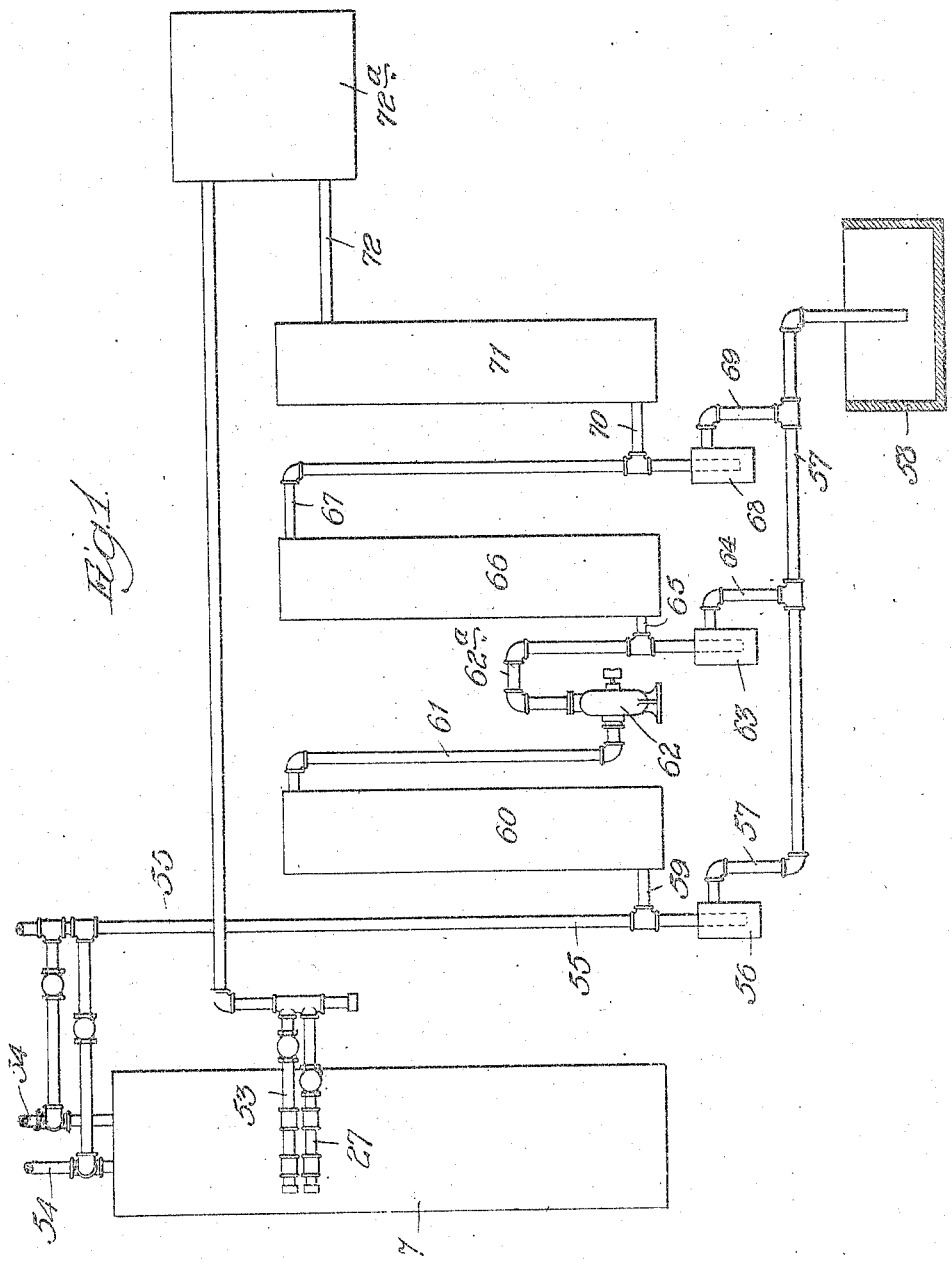

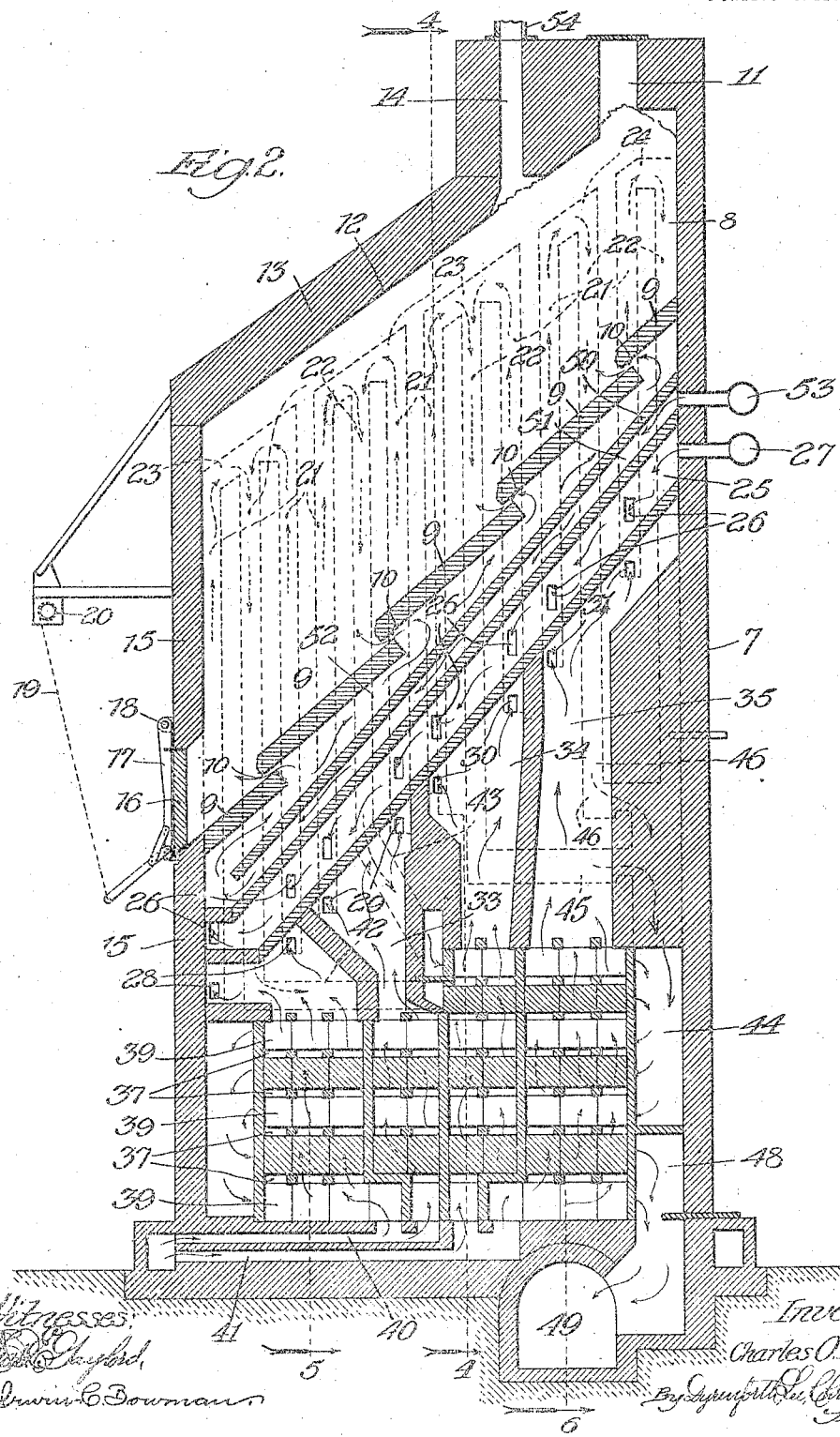

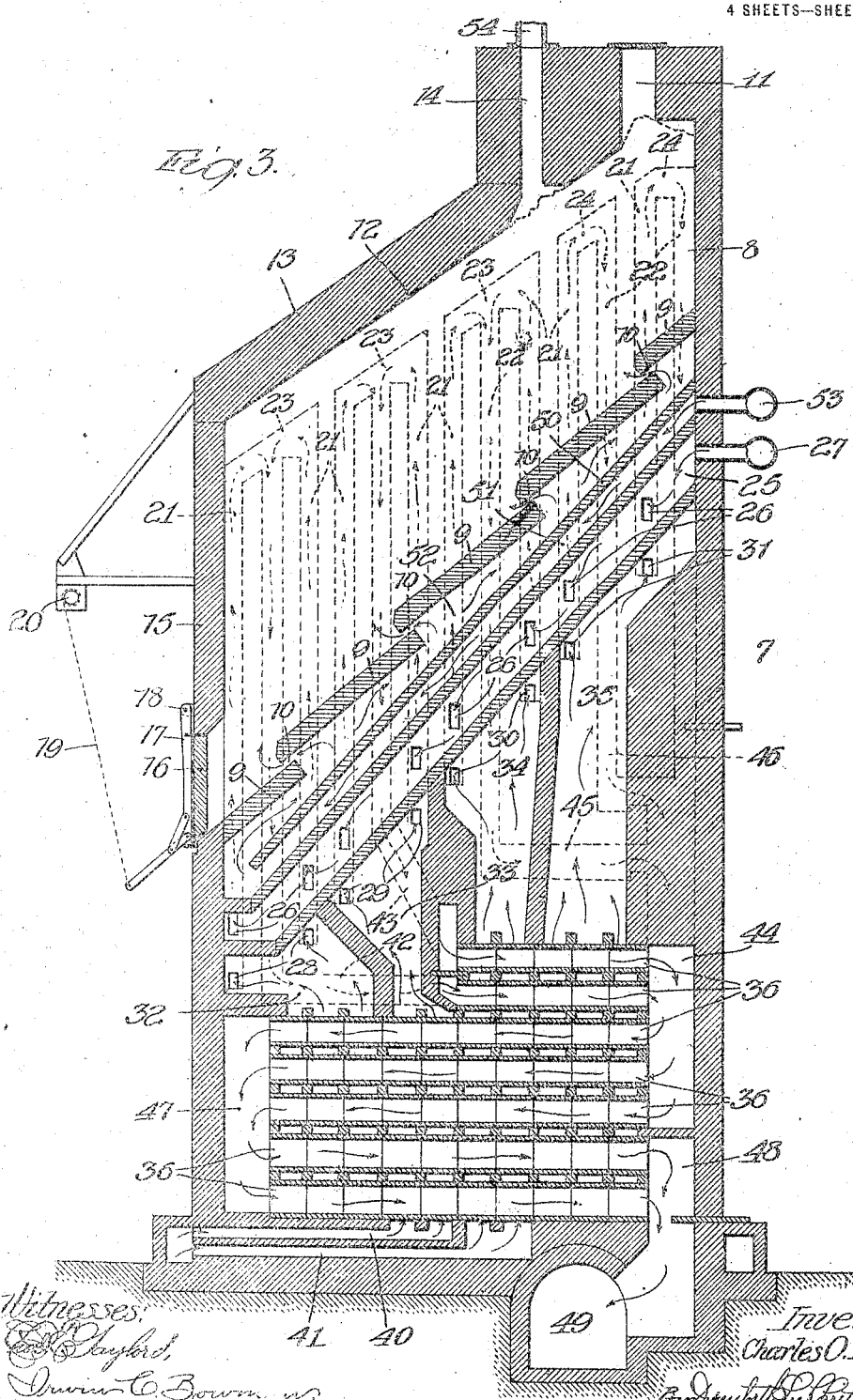

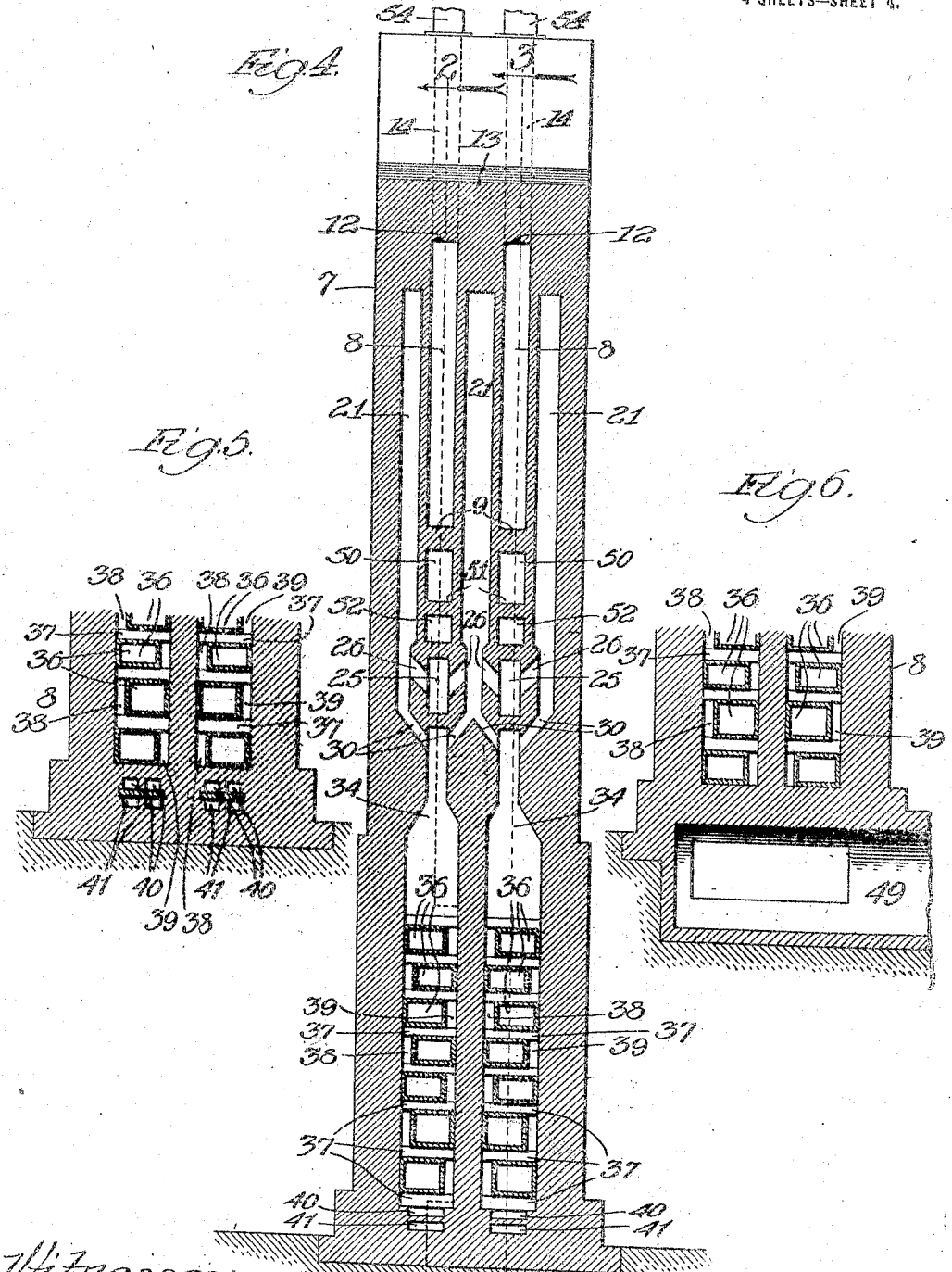

CHARLES O. HOOVER, OF DENVER, COLORADO, ASSIGNOR, BY MESNE ASSIGNMENTS, TO J. D. LUMAGHI, L. F. LUMAGHI, AND R. D. HATTON, TRUSTEES.

APPARATUS FOR TREATING MATERIAL CONTAINING CONDENSABLE VOLATILE MATTER.

1,305,109.

Specification of Letters Patent. Patented May 27, 1919.

Application filed July 14, 1917. Serial No. 180,532.

*To all whom it may concern:*

Be it known that I, CHARLES O. HOOVER, a citizen of the United States, residing at 2116 South Logan street, Denver, in the county of Denver and State of Colorado, have invented a new and useful Improvement in Apparatus for Treating Material Containing Condensable Volatile Matter, of which the following is a specification.

My invention relates, more particularly, to apparatus for retorting solid material containing condensable volatile matter, such as bituminous coal, lignite, oil-bearing shales, and the like, for the recovery therefrom, in liquid form, of the volatile matter contained therein, and in addition where the solid matter is carbonaceous, the production of a residue of solid matter having characteristics rendering it highly suitable for fuel purposes, my invention having been devised for use more particularly in practising the method of treating solid material containing condensable volatile matter which forms the subject of my co-pending application for United States Patent, Serial No. 178,645, filed July 5, 1917, and which, generally stated, consists in subjecting the material to be treated, to heat in a retort, or the like, sufficient to volatilize volatilizable matter in the solid material and passing through the mass of pieces of solid material, during the volatilizing operation, a fluid of such character that it will not result in the combustion of the solid matter being retorted, or the volatile matter evolved therefrom, to act as a vehicle and carry off the volatilized matter, the volatilized matter being preferably subjected to suction for maintaining the pressure in the retort at substantially that of the atmosphere, though certain features of my invention may be utilized in apparatus not used in practising the said method.

My primary objects, generally stated, are to provide an apparatus by which a comparatively higher percentage of the condensable volatile matter contained in the solid material for treatment, may be recovered therefrom in a liquid state, and the remaining solid material, when of a carbonaceous nature, may, by preference, be rendered peculiarly fit for fuel purposes, and in this connection to prevent the "cracking" of the lighter hydrocarbon vapors evolved from the material undergoing treatment, such "cracking" resulting from the commercial use of apparatus as hitherto provided and used, and to recover the same in liquid condition; to provide for the subjection of the solid material uniformly to the volatilizing heat; to provide for the even and uniform movement of the solid material in settling in the retort or oven, due to shrinkage of the material during its treatment; to provide for the uninterrupted flow into the retorting chamber of the fluid, forming the vehicle for the volatilized matter; and other objects as will be understood from the following.

Referring to the accompanying drawings:—

Figure 1 is a view in elevation and in the nature of a diagram, of an apparatus embodying my invention. Fig. 2 is a view in vertical sectional elevation of the retort or carbonizing oven forming a portion of the apparatus illustrated in Fig. 1, certain of the parts thereof being shown by dotted representation, this view being taken at the line 2, 2 on Fig. 4 and viewed in the direction of the arrows. Fig. 3 is a section taken at the line 3 on Fig. 4 and viewed in the direction of the arrow. Fig. 4 is a section taken at the irregular line 4, 4 on Fig. 2 and viewed in the direction of the arrows. Fig. 5 is a section taken at the line 5 on Fig. 2 and viewed in the direction of the arrow; and Fig. 6, a section taken at the line 6 on Fig. 2 and viewed in the direction of the arrow.

The apparatus shown in Fig. 1 comprises a retort or carbonizing oven represented at 7 in Fig. 1 and in detail in the remaining figures of the drawings. The oven 7, which is built of refractory material, as is common in the construction of carbonizing ovens, as hitherto constructed, contains a plurality of carbonizing compartments 8, which may be provided of any desirable number, and if desired one only being employed, these compartments extending substantially vertically and spaced apart as indicated. The bottom of each of the compartments 8 is formed of a series of plate-sections 9, which are arranged in relatively overlapping position, and in a series inclining to the vertical, as indicated in Fig. 2. The lower ends of the plates 9 overlap the adjacent upper ends of the plates next adjacent thereto, and are vertically spaced therefrom, as indicated in Fig. 2, to provide a series of slots 10 extending completely across the compartments 8, and through which the fluid forming the vehicle, and which by preference is a gaseous hydrocarbon, is introduced as hereinafter described. Each compartment 8 contains a filling opening 11 through which the material to be carbonized in the compartments 8 is dumped into these compartments to fill them, the bottom surface 12 of the roof 13 of the compartments inclining in the same general direction as the plates 9, and at such an angle as to correspond with the angle of repose of the material to be treated in the compartments, each of the latter containing a gas and vapor outlet passage 14 located slightly closer to the extreme upper end of the compartment than to the lower end thereof. The outlets for the material remaining in the compartments 8 after the carbonizing operation is completed are located in the front wall 15 of the oven adjacent the lower extremity of the floors formed of the plates 9. The door for one of the compartments 8 is represented in Figs. 2 and 3, at 16, this door being connected with lever mechanism 17, hinged at 18 and connected with a cable 19 on a drum 20, adapting the door 16 to be swung upwardly and to the left in Fig. 2, to uncover the outlet. If found desirable, these doors 16 may be made of a height equal to the height of the compartments 8 at their left-hand ends, in Fig. 2.

Located in the walls of the structure to extend at opposite sides of and between the compartments 8, as shown, are flues 21 and 22, in which fuel is introduced for producing the heat necessary to effect the desired carbonizing of the material in the compartments 8. In the particular arrangement illustrated each series of flues 21 is made up of three groups of two each, each group coöperating with a single one of the flues 22 interposed therebetween, and two groups of one each, each of these two last referred to flues 21 coöperating with a flue 22. In the case of the three groups of flues 21, these flues connect with the coöperating flues 22 through the medium of cross passages 23 at their upper ends, and in the case of the other flues 21 these communicate with the upper ends of the flues 22, by means of the cross passages 24. The flues 21, 22 and 23 extend upwardly alongside the compartments 8, as shown, but preferably reach short of the tops of these compartments, preferably about twelve to eighteen inches.

In the operation of the oven in the form shown, the heat for the carbonizing operation is produced by the combustion of any suitable fuel gas introduced into the bases of the flues 21, and therein mixed with air, preferably supplied to these flues in preheated condition. In the arrangement shown a gas-conduit, represented at 25, extends below and in vertical alinement with each of the compartments 8, these conduits inclining preferably in parallel relation with the bottom portions of the compartments 8, and containing outlets, or nostrils, 26, in their opposite side walls which open into the flues 21, any suitable fuel gas being supplied to these conduits, as for example from the source as hereinafter described, through the pipes 27 which open into the upper ends of these conduits. The air for mixture with the fuel gases introduced into the flues 21 to support combustion of these gases therein, is admitted into these flues through openings, or nostrils, 28, 29, 30 and 31, communicating with conduits 32, 33, 34 and 35. The conduits just referred to communicate with the outlets of a sectional recuperator for heating the air before it passes into the flues 21, the provision of the several conduits 32, 33, 34 and 35 serving to permit of the separate control of the heat in the combustion flues 21. The recuperator referred to, there being one provided for each compartment 8, is of common construction, presenting a vertical series of horizontally disposed conduits, or passages, 36, for a heating medium as hereinafter described, these conduits being arranged in staggered relation, as shown in Fig. 4, to afford a series of passages 37 between adjacent conduits 36 and vertical passages 38 and 39 which alternate with each other, and are arranged at opposite sides, respectively, of the conduits 36 and connect together adjacent ones of the passages 37, thus forming a zigzag or tortuous course around these conduits for the passage of air entering the lower inlet ends of the recuperator through pipes 40 and 41 communicating with the atmosphere, it being readily understood that dampers, or other suitable regulating means, may be provided at any part of the course thus provided for the air in its passage to the flues 21, to control the combustion in these flues.

The flues 22 are what might be termed return-flues, and serve to conduct the products of combustion to the conduits which communicate with the stack. The flues 22 of the groups thereof at the extreme lower end of the oven, communicate at their lower ends with flues 42 which open into the left-hand ends of the next to the top ones of the tiers of conduits 36, the groups of flues 22 which are next to the ones just referred to, communicate with conduits 43 which open into the uppermost tier of conduits 36, these conduits opening at their right-hand ends in Fig. 3 into a cross-chamber 44, which is also in communication with the right-hand ends of the next three tiers of conduits 36, the chamber 44 also communicating through the medium of conduits 45 and 46 with the next two of the return flues 22 of each series thereof, and with the lower end of the flue 22 of each group shown at the extreme right in Figs. 2 and 3. The left-hand ends of the lowermost five tiers of the conduits 36 and the right-hand ends of the two lowermost tiers of the conduits 36 communicate with a chamber 48 which opens into a passage 49, which, in practice, would lead to the smoke stack.

From the foregoing it will be readily understood that air and gas is supplied to the flues 21 for combustion therein, the products of combustion passing downwardly through the return flues 22, where they serve by passing through the recuperator as indicated by the arrows, to pre-heat the air supplied to the flues 21 and thereby augment combustion.

Located below the floor-portion of each compartment 8 is an inclined partition 50 located between, and in spaced relation to, the said floor and the upper wall of the conduit 25 immediately below it, this being duplicated for each compartment 8. The lower ends of the partitions 50 are spaced from the adjacent wall of the structure as shown in Fig. 3, thereby presenting passages 51 and 52 which extend generally parallel with each other, and communicate at their lower ends, the passages 51 opening at their upper ends into a conduit 53 for connection with any suitable source of fluid, preferably a gaseous hydrocarbon, as above stated, supplied preferably as hereinafter described.

In the particular apparatus illustrated, the outlets 14 communicate with pipes 54 which communicate with a pipe 55, preferably subjected to the cooling action of water, as by means of water sprayed through it in a manner not shown, but as is well understood in the art, the lower end of this pipe opening into a seal-pot 56 which communicates with an overflow pipe 57 entering the pot 56 above the lower end of the pipe 55, and discharging at its other end into a tank 58. A pipe 59 connects the pipe 55 above the seal-pot 56 with the lower end of a gas washer 60 of any suitable construction, such as is well known in the art, and involving a water-spraying device for spraying the gases and vapors as they rise through the washer 60, the upper end of this washer being connected with a pipe 61 opening into the inlet end of an exhauster 62, and which may be of the type known as the Root exhauster, the discharge end of this exhauster being connected with a pipe 62ª which opens at its lower end into a seal-pot 63 having a discharge pipe 64 communicating with the pipe 57, the pipe 62 being connected by a pipe 65 with the lower end of another washer 66 like the washer 60, the upper end of which communicates with a pipe 67 extending into a seal-pot 68, with a pipe 69 leading from the latter into the pipe 57. The pipe 67 connects by a pipe 70 with another washer 71 like the washer 60, the washers referred to being provided of any suitable number, depending upon the particular conditions presented and which will be well understood by those skilled in the art.

The last one of the series of washers, which is the washer 71 in the particular arrangement illustrated, is connected at its discharge end with a pipe 72 which preferably has a gasometer 72ª interposed therein, and which communicates with the conduits 27 and 53 to furnish to conduit 27 fuel for operating the oven, and to the conduit 53 a gaseous hydrocarbon for passage through the solid material while being subjected to the action of heat.

The operation of the apparatus as described is as follows: The material to be treated to the heat in the oven is discharged into the compartments 8 through the inlets 11, as from Larry cars (not shown) which in practice would be provided to run along the top of the ovens, the compartments being completely filled. Assuming that the material thus charged into the compartments 8 is undergoing subjection to heat generated in the flues 21, the volatile matter evolved from the material being treated rises through the mass thereof and, under the action of the exhauster 62 and the fluid introduced into the compartments 8 through the perforated floors thereof under the pressure created by the discharge from the exhauster, is caused to be carried from the compartments 8 through the outlets 14 without unduly prolonging subjection of the volatilized matter to the heat, thereby to avoid the "cracking" above referred to. A gaseous hydrocarbon is preferably employed as the vehicle medium referred to, this gas being preferably derived from the material being treated and introduced into the compartments 8 in heated condition, by reason of its subjection to the heat in the flues 21 and 22 in passing through the passages 51 and the passage immediately above the latter. The vapors and gases which are discharged from the compartments 8 pass, under the action of the exhauster 62, through the pipes 54 and pipe 55, wherein they are subjected preferably to the action of the cooling water therein. Such of the vapors as become condensed in the pipe 55, together with the cooling water, when employed, discharge from the open lower end of this pipe 55 into the seal-pot 56, the contents of this pot overflowing through the pipe 57 into the receiver 58. Such of the vapors and gases as do not condense in the pipe 55 pass therefrom through the pipe 59 into the lower end of the washer 60, wherein the noncondensed gases are washed, as is well understood in the art, such of the vapors as condense in this washer flowing therefrom through the pipe 59 into the seal-pot 56. The gases and vapors which are not condensed in the washer 60 discharge therefrom through the pipe 61, thence through the exhauster 62, from which latter discharge takes place through the pipe 62ª, the vapors condensed in this pipe discharging into the seal-pot 63, and the uncondensed gases and vapors passing through the pipe 65 into the washer 66, the vapors condensed therein discharging through the pipe 65 into the seal-pot 63, and the uncondensed gases and vapors discharging through the pipe 67 into the washer 71, such of the vapors as condense in the pipe 67 and washer 71 discharging into the seal-pot 68. It is intended that the washers be provided of such number that the gas discharging from the last one thereof, which in the particular arrangement illustrated is the washer 71, shall be free of all condensable volatile matter, which in the passage of the gases and vapor through the washer is removed therefrom and collected in the tank 58 for any suitable treatment for separating the oils from the water, and the subsequent treatment of the oils as desired, depending upon the products to be derived from the oils. The gas which discharges through the pipe 72 is a gaseous hydrocarbon necessarily of a fixed nature, and of such character that it will not combine chemically with the condensable, volatile matter evolved from the material being treated to heat in the carbonizing oven, this gas under the action of the exhauster 62 being caused, by preference, to enter the passages 25 for supplying to the flues 21 for combustion therein as hereinbefore stated, and supply to the passages 51 a gaseous hydrocarbon as hereinbefore explained, for passage therefrom into the passages immediately thereabove, and thence through the slots 10 between adjacent floor plates 9, into the mass or pieces of solid material undergoing treatment in the compartments 8. The gaseous hydrocarbon is thus introduced into the compartments 8 at intervals, along the bottoms thereof, and in rising through the mass of material becomes substantially uniformly distributed throughout the mass, not only substantially uniformly acting upon the the vapors throughout the mass of the solid material, to perform the function of preventing "cracking" of the vapors as hereinbefore explained, but also serving, by reason of its uniform distribution throughout the mass and the preheating thereof in its passage to the apertured floors of the compartments, to effect substantially uniform dissemination of the heat throughout the masses in the compartments.

The feature last above referred to, especially in connection with the condition of the flues 21 and 22 reaching short of the upper extremities of the compartments 8, but not to such a point that the material being treated will, in shrinking under the action of the heat, extend below these flues, is of importance not only because thereby a larger per cent. of condensable volatile matter is recovered in liquid condition, but because the residue of solid material in the compartments 8 is in the form of a substantially uniform product which, when the material being treated is of a carbonaceous character, as for example, coals, lignite and similar substances, is of great practical importance, as the residue may be used for fuel.

When the carbonizing operation is concluded the doors 16 of the compartments 8 are opened which permits the pieces of carbon remaining in these compartments to discharge therefrom into a quenching car (not shown) which, by preference, is at once run to the end of the structure into position under a quenching tower where it is subjected to the cooling action of water, and after which the carbon may be transferred to storage bins.

In the use of the apparatus illustrated in practising the process hereinbefore referred to, it is desirable that the mass of material in the oven be subjected in its initial treatment to relatively low temperature for driving off the more readily volatilizable condensable matter, and as the carbonizing operation proceeds heating the material in the compartments to progressively increasing temperatures, whereby the volatile matter of varying specific gravities, contained in the material being treated is recovered therefrom. In using my apparatus, however, with carbonaceous material containing condensable volatile matter, such as coals, lignite, and other similar substances, and where it is desired that the two-fold purpose of recovering the volatile constituents of the material and producing as a fuel by-product, the residue in the carbonizing oven, it is preferred that the material be heated in the carbonizing thereof, to a degree less than that required for coking it, preferably about 450° C. in the case of bituminous coal. Thus treating the carbonaceous material while effecting the recovery therefrom of the most valuable condensable volatile ingredients thereof, results in the production of a highly desirable fuel, in that it is rendered substantially smokeless, has a low kindling point and contains a relatively large amount of volatile matter, which would be of the methane series, and which is unrecoverable in a liquid state from a commercial standpoint according to existing methods, and this is also true in the case of the treatment of lignite, and similar materials.

In the operation of the apparatus as hereinbefore described, it will be understood that the introduction of a charge of material to be treated, into the compartments 8, by reason of its relatively great bulk, will temporarily greatly reduce the heat of the structure, and thus in the maintaining of a uniform flow of gas for combustion in the flues 21, the material to be treated is caused, as it continues to absorb heat, to be subjected to progressively increasing degrees of heat.

The feature of disposing the under-surface 12 of the roof in a plane substantially parallel with the plane in which the upper surface of a mass of the pieces of material to be treated extends when in repose, is of advantage in a retort in that creeping of the mass of material in the shrinking of the mass with the obvious disadvantages, is avoided.

The feature of forming the bottoms of the compartments 8, as explained, to provide the openings 10 arranged as shown is of advantage as thereby clogging of these inlets for the fluid, by pieces of the material being treated, is avoided.

While I have illustrated and described a particular embodiment of my invention, I do not wish to be understood as intending to limit it thereto as the structure shown may be variously modified and altered and the invention embodied in other forms, without departing from the spirit of my invention, it being my intention to claim my invention as fully and completely as the prior state of the art will permit.

What I claim as new and desire to secure by Letters Patent is:

1. In apparatus for treating solid material to heat, the combination of a chamber for receiving the material to be treated and containing an outlet, means for heating the material in said chamber to volatilize matter therein and including flues extending along said chamber, a conduit for fluid extending below the bottom of said chamber and positioned to be subjected to heat from said flues, and means communicating with said conduit at the end thereof opposite its inlet for leading all of the fluid entering said conduit into the lower portion of said chamber at different points along the latter, whereby all the fluid entering said chamber from said conduit is caused to travel substantially the full length of said conduit before discharging into said chamber.

2. In apparatus for treating solid material to heat, the combination of a chamber for receiving the material to be treated and containing an outlet, means for heating the material in said chamber to volatilize matter therein and including flues extending along said chamber the bottom of said chamber containing openings spaced apart, a conduit for fluid extending below the bottom of said chamber and positioned to be subjected to heat from said flues, and means communicating with said conduit at the end thereof opposite its inlet and with the openings in the bottom of said chamber for leading all of the fluid entering said conduit into the lower portion of said chamber at different points along its bottom, whereby all the fluid entering said chamber from said conduit is caused to travel substantially the full length of said conduit before discharging into said chamber.

3. In apparatus for treating solid material to heat, the combination of a chamber for receiving the material to be treated and containing an outlet, means for heating the material in said chamber to volatilize matter therein and including flues extending along said chamber, a passage for fluid extending crosswise of said chamber and opening into the latter, and a conduit for fluid extending in substantially the same direction as said passage and below said passage, said conduit at the end thereof opposite its inlet, communicating with said passage whereby all the fluid entering said chamber from said conduit is caused to travel substantially the full length of said conduit before discharging into said chamber.

4. In apparatus for treating solid material to heat, the combination of a chamber for receiving the material to be treated and containing an outlet, means for heating the material in said chamber to volatilize matter therein and including flues extending along said chamber, a passage for fluid extending below the bottom of said chamber and opening into the latter at intervals along said bottom, and a conduit for fluid extending below said passage and in substantially the same direction, said conduit opening at its end thereof opposite its inlet, into said passage, whereby all the fluid entering said chamber from said conduit is caused to travel substantially the full length of said conduit before discharging into said chamber.

5. In apparatus for treating solid material to heat, the combination of a substantially upright chamber for receiving the material to be treated and containing an outlet near its upper end, means for subjecting the walls of said chamber to heat comprising a series of flues extending along the walls of said chamber, the bottom of said chamber being inclined and formed of a plurality of sections arranged in stepped relation with openings between their relatively overlapping ends affording a series of fluid-inlets along the bottom of said chamber, a passage for fluid extending along and beneath the bottom of said chamber and in communication with the fluid-inlets in the latter, and a conduit for fluid extending in inclined position beneath said passage and communicating at the end thereof opposite its inlet, with said passage, said passage and conduit being positioned to be subjected to the heat from said flues, whereby all the fluid entering said chamber from said conduit is caused to travel substantially the full length of said conduit before discharging into said chamber.

CHARLES O. HOOVER.